United States Patent
Ekseth et al.

(10) Patent No.: US 7,117,605 B2
(45) Date of Patent: Oct. 10, 2006

(54) SYSTEM AND METHOD FOR USING MICROGYROS TO MEASURE THE ORIENTATION OF A SURVEY TOOL WITHIN A BOREHOLE

(75) Inventors: Roger Ekseth, Sjetnemarka (NO); Gary William Uttecht, Houston, TX (US)

(73) Assignee: Gyrodata, Incorporated, Houston, TX (US)

(*) Notice: Subject to any disclaimer, the term of this patent is extended or adjusted under 35 U.S.C. 154(b) by 364 days.

(21) Appl. No.: 10/823,091

(22) Filed: Apr. 13, 2004

(65) Prior Publication Data

US 2005/0224257 A1    Oct. 13, 2005

(51) Int. Cl.
G01C 19/56 (2006.01)
G01C 21/16 (2006.01)
E21B 47/22 (2006.01)

(52) U.S. Cl. ............... 33/304; 33/313; 33/321; 73/504.04

(58) Field of Classification Search .......... 33/302, 33/303, 304, 313, 321, 322, 323; 73/152.46, 73/152.54, 504.02, 504.03, 504.04, 493, 73/510; 175/45
See application file for complete search history.

(56) References Cited

U.S. PATENT DOCUMENTS

| | | | |
|---|---|---|---|
| 3,143,892 A * | 8/1964 | Chapman | 74/5.34 |
| 3,741,500 A * | 6/1973 | Liden | 244/165 |
| 4,537,067 A | 8/1985 | Sharp et al. | |
| 4,909,336 A | 3/1990 | Brown et al. | |
| 4,987,684 A | 1/1991 | Andreas et al. | |
| 5,099,927 A | 3/1992 | Gibson et al. | |
| 5,432,699 A | 7/1995 | Hache et al. | |
| 5,635,638 A | 6/1997 | Geen et al. | |
| 5,635,640 A | 6/1997 | Geen et al. | |
| 5,657,547 A | 8/1997 | Uttecht et al. | |
| 5,806,195 A | 9/1998 | Uttecht et al. | |
| 5,812,068 A | 9/1998 | Wisler et al. | |
| 5,821,414 A | 10/1998 | Noy et al. | |
| 5,842,149 A | 11/1998 | Harrell et al. | |
| 5,869,760 A * | 2/1999 | Geen | 73/504.12 |
| 5,912,524 A | 6/1999 | Ohnishi et al. | |
| 6,021,377 A | 2/2000 | Dubinsky et al. | |
| 6,044,706 A | 4/2000 | Roh | |

(Continued)

FOREIGN PATENT DOCUMENTS

EP    0 646 696 A1    9/1994

(Continued)

OTHER PUBLICATIONS

±150°/s *Single Chip Yaw Rate Gyro with Signal Conditioning*, Analog Devices, ADXRS150, © 2003 Analog Devices, Inc.

(Continued)

*Primary Examiner*—R. Alexander Smith
(74) *Attorney, Agent, or Firm*—Knobbe, Martens, Olson & Bear, LLP (57) ABSTRACT

A system and method for determining an orientation of the survey tool within a borehole utilizes a survey tool including a plurality of rotation sensors each having a sensing axis and a direction of least acceleration sensitivity. The plurality of rotation sensors are mounted in a housing with their sensing axes generally parallel to one another and with their directions of least acceleration sensitivity generally non-parallel to one another. The survey tool further includes a controller adapted to calculate a weighted average of the detected angular rotation rates from the plurality of rotation sensors. The weighted average includes the detected angular rotation rate of each rotation sensor about its sensing axis weighted by the detected acceleration along its direction of least acceleration sensitivity.

38 Claims, 6 Drawing Sheets

U.S. PATENT DOCUMENTS

| | | | |
|---|---|---|---|
| 6,089,089 | A | 7/2000 | Hsu |
| 6,122,961 | A | 9/2000 | Geen et al. |
| 6,134,961 | A | 10/2000 | Touge et al. |
| 6,145,378 | A | 11/2000 | McRobbie et al. |
| 6,173,773 | B1 | 1/2001 | Almaguer et al. |
| 6,192,748 | B1 | 2/2001 | Miller |
| 6,206,108 | B1 | 3/2001 | MacDonald et al. |
| 6,257,356 | B1 | 7/2001 | Wassell |
| 6,267,185 | B1 | 7/2001 | Mougel et al. |
| 6,281,618 | B1 | 8/2001 | Ishitoko et al. |
| 6,315,062 | B1 | 11/2001 | Alft et al. |
| 6,347,282 | B1 | 2/2002 | Estes et al. |
| 6,360,601 | B1 | 3/2002 | Challoner et al. |
| 6,381,858 | B1 | 5/2002 | Shirasaka |
| 6,453,239 | B1 | 9/2002 | Shirasaka et al. |
| 6,484,818 | B1 | 11/2002 | Alft et al. |
| 6,655,460 | B1 | 12/2003 | Bailey et al. |
| 6,659,201 | B1 | 12/2003 | Head et al. |
| 6,845,665 | B1 * | 1/2005 | Geen .................. 73/504.04 |
| 6,848,304 | B1 * | 2/2005 | Geen .................. 73/504.04 |
| 6,859,751 | B1 * | 2/2005 | Cardarelli ............. 702/141 |
| 6,895,678 | B1 * | 5/2005 | Ash et al. .............. 33/313 |
| 2002/0056201 | A1 | 5/2002 | Dallas et al. |
| 2002/0112887 | A1 | 8/2002 | Harrison |
| 2005/0183502 | A1 * | 8/2005 | Rodney ................. 73/504.02 |
| 2005/0224257 | A1 * | 10/2005 | Ekseth et al. ............ 175/45 |

FOREIGN PATENT DOCUMENTS

| | | |
|---|---|---|
| WO | 2004/021899 | 7/2004 |
| WO | 2005/012317 | 4/2005 |

OTHER PUBLICATIONS

±300°/s *Single Chip Yaw Rate Gyro with Signal Conditioning*, Analog Devices, ADXRS300.

Geen, J., et al., *New iMEMS® Angular-Rate-Sensing Gyroscope*, Analog Dialogue, 2003, vol. 37, No. 3, pp. 1-4.

Teegarden, Darrell, et al., *How to Model and Stimulate Microgyroscope Systems,* IEEE Spectrum, Jul. 1998, vol. 35, No. 7, pp. 66-75.

Yazdi, N., et al., *Micromachined Inertial Sensors,* Proc. of the IEEE, Aug. 1998, vol. 86, No. 8, pp. 1640-1659.

US 6,151,553, 11/2000, Estes et al. (withdrawn)

\* cited by examiner

SYSTEM AND METHOD FOR USING MICROGYROS TO MEASURE THE ORIENTATION OF A SURVEY TOOL WITHIN A BOREHOLE

BACKGROUND OF THE INVENTION

1. Field of the Invention

The present application relates generally to systems and methods for determining the orientation of a survey tool within a borehole.

2. Description of the Related Art

Directional drilling for the exploration of oil and gas deposits advantageously provides the capability of generating boreholes which deviate significantly relative to the vertical direction (that is, perpendicular to the Earth's surface) by various angles and extents. In certain circumstances, directional drilling is used to provide a borehole which avoids faults or other subterranean structures (e.g., salt dome structures). Directional drilling is also used to extend the yield of previously-drilled wells by reentering and milling through the side of the previously-drilled well, and drilling a new borehole directed so as to follow the hydrocarbon-producing formation. Directional drilling can also be used to provide numerous boreholes beginning from a common region, each with a shallow vertical portion, an angled portion extending away from the common region, and a termination portion which can be vertical. This use of directional drilling is especially useful for offshore drilling, where the boreholes are drilled from the common region of a centrally positioned drilling platform.

Rotatably steerable drilling systems which are configured to respond to control signals by adjusting the direction of drilling are known in the prior art. Exemplary rotatably steerable drilling systems are disclosed by U.S. Pat. No. 6,659,201, U.S. Pat. No. 6,655,460, U.S. Pat. No. 6,257,356, and U.S. Pat. No. 5,099,927, each of which is incorporated in its entirety by reference herein.

Directional drilling is also used in the context of horizontal directional drilling ("HDD") in which a pathway is drilled for utility lines for water, electricity, gas, telephone, and cable conduits. Exemplary HDD systems are described by Alft et al. in U.S. Pat. Nos. 6,315,062 and 6,484,818. Such HDD systems typically drill along relatively short distances substantially horizontal to the surface and do not drill very far below the surface. In addition, these HDD systems typically drill holes which reemerge as well.

The pathway of a directionally drilled borehole is typically carefully planned prior to drilling, and the position and direction of the drilling tool is repeatedly determined during the drilling process using surveys to map the pathway of the borehole relative to a fixed set of known coordinates. In certain types of wireline surveys, the drilling of the borehole is periodically halted and a survey tool is lowered into the borehole. In some instances, the drilling assembly (i.e., the drill string and the drilling tool, which includes the drill bit) is removed from the borehole so that the survey tool can be lowered into the borehole. In other types of wireline surveys, the drilling assembly remains in the borehole and the survey tool is lowered into the drilling assembly. As the survey tool is guided along the borehole, it provides information regarding its orientation and location by sending signals through a cable to the surface. This information is then used to determine the pathway of the borehole. The survey tool is then removed from the borehole and drilling is continued, which may require returning the drilling assembly to the borehole if it was removed for the survey. Such wireline surveys thus require extensive time and effort to repeatably stop drilling, insert the survey tool into the borehole, and remove the survey tool (and perhaps the drilling assembly) each time a survey is performed. Since the costs associated with operation of a drilling system can be quite high, any time reductions in borehole surveying can result in substantial cost savings.

In "measurement while drilling" ("MWD") drilling systems, the survey tool is a component of the drilling system. In such drilling systems, the survey tool can be a component of the drilling tool, typically in proximity to the drill bit, and it remains within the borehole throughout the drilling process. MWD survey measurements of the orientation and location of the MWD survey tool can be made without removing the drilling assembly from the borehole. Typically, MWD survey measurements are taken during periods in which additional drill pipes are connected to extend the drill string and the drilling assembly is substantially stationary, which takes approximately one to two minutes to a few minutes. Use of MWD surveys saves time during operation of the drilling system by eliminating the need to stop the drilling process or to remove and replace the survey tool (and perhaps the drilling assembly) in order to survey the pathway of the borehole. Such MWD drilling systems are known in the art.

In "logging while drilling" ("LWD") drilling systems, the drilling system includes a survey tool and a logging string having one or more geophysical sensors configured to provide information regarding the geological formations surrounding the borehole at various depths. Examples of geophysical sensors compatible with LWD drilling systems include, but are not limited to, geophones configured to make porosity and/or density measurements using sonar, gamma-ray detectors configured to detect gamma rays from the surrounding geological formations, and resistivity sensors configured to make porosity and/or pore content measurements. In addition, certain LWD logging strings include calipers configured to mechanically sense aspects of the borehole and its casing (e.g., size, amount of wear). In certain instances, the survey tool is a component of the logging string, while in other instances, the survey tool is in proximity to the logging string. Such LWD drilling systems are known in the art.

Gyroscopes, together with accelerometers, have been used in survey tools to measure the azimuth and the inclination of a borehole at a given depth, and the high-side toolface and/or the azimuthal toolface of the survey tool at the same depth. Such measurements typically utilize a minimum number of sensitive gyroscope axes (i.e., the gyroscope provides angular rotation rate information for rotations about these axes). Existing survey tools include only the minimum number of sensitive gyroscope axes to perform the desired measurements, due to the high costs of spinning-wheel and ring-laser gyroscopes.

SUMMARY OF THE INVENTION

In certain embodiments, a survey tool determines an orientation of the survey tool within a borehole. The survey tool comprises a plurality of rotation sensors. Each rotation sensor has a sensing axis and a direction of least acceleration sensitivity. Each rotation sensor is adapted to generate a first signal indicative of a detected angular rotation rate about its sensing axis. The plurality of rotation sensors are mounted in a housing with their sensing axes generally parallel to one another and with their directions of least acceleration sensitivity generally non-parallel to one another. The survey tool further comprises a plurality of acceleration sensors mounted in the housing. Each acceleration sensor has a sensing direction. Each acceleration sensor is adapted to generate a second signal indicative of detected acceleration along its sensing direction. The survey tool further comprises a controller adapted to receive a first signal from each of the plurality of rotation sensors and a second signal from each of the plurality of acceleration sensors. The controller is adapted to calculate a weighted average of the detected angular rotation rates from the plurality of rotation sensors. The weighted average includes the detected angular rotation rate of each rotation sensor about its sensing axis weighted by the detected acceleration along its direction of least acceleration sensitivity.

In certain embodiments, a control system of a rotatably steerable drilling system is configured to drill in a selected drilling direction of a plurality of drilling directions. The control system is configured to adjust the selected drilling direction. The control system comprises a plurality of rotation sensors. Each rotation sensor has a sensing axis and a direction of least acceleration sensitivity. Each rotation sensor is adapted to generate a first signal indicative of a detected angular rotation rate about its sensing axis. The plurality of rotation sensors are mounted in a housing with their sensing axes generally parallel to one another and with their directions of least acceleration sensitivity generally non-parallel to one another. The control system further comprises a plurality of acceleration sensors mounted in the housing. Each acceleration sensor has a sensing direction. Each acceleration sensor is adapted to generate a second signal indicative of detected acceleration along its sensing direction. The control system further comprises a controller adapted to receive a first signal from each of the plurality of rotation sensors and a second signal from each of the plurality of acceleration sensors. The controller is adapted to calculate a weighted average of the detected angular rotation rates from the plurality of rotation sensors. The weighted average includes the detected angular rotation rate of each rotation sensor about its sensing axis weighted by the detected acceleration along its direction of least acceleration sensitivity.

In certain embodiments, a method determines an orientation of a survey tool within a borehole. The method comprises providing a plurality of rotation sensors. Each rotation sensor has a sensing axis and a direction of least acceleration sensitivity. The plurality of rotation sensors have their sensing axes generally parallel to one another and their directions of least acceleration sensitivity generally non-parallel to one another. The method further comprises obtaining a detected angular rotation rate from each rotation sensor. Each detected angular rotation rate being about the sensing axis of the corresponding rotation sensor. The method further comprises obtaining a detected acceleration along the directions of least acceleration sensitivity of each of the rotation sensors. The method further comprises calculating a weighted average of the detected angular rotation rates from the plurality of rotation sensors. The weighted average includes the detected angular rotation rate of each rotation sensor about its sensing axis weighted by the detected acceleration along its direction of least acceleration sensitivity.

In certain embodiments, a rotatably steerable drilling system is provided. The drilling system comprises a drill string configured to drill in a selected direction of a plurality of directions. The drill string comprises a drill bit. The drilling system further comprises a survey tool in proximity to the drill bit. The survey tool comprises a plurality of rotation sensors. Each rotation sensor has a sensing axis and a direction of least acceleration sensitivity. Each rotation sensor is configured to generate a first signal indicative of a detected angular rotation rate about its sensing axis. The plurality of rotation sensors is mounted in a housing with their sensing axes generally parallel to one another and with their directions of least acceleration sensitivity generally non-parallel to one another. The survey tool further comprises a plurality of acceleration sensors mounted in the housing. Each acceleration sensor has a sensing direction. Each acceleration sensor is configured to generate a second signal indicative of detected acceleration along its sensing direction. The survey tool further comprises a controller configured to receive a first signal from each of the plurality of rotation sensors and a second signal from each of the plurality of acceleration sensors. The controller is configured to calculate a weighted average of the detected angular rotation rates from the plurality of rotation sensors. The weighted average includes the detected angular rotation rate of each rotation sensor about its sensing axis weighted by the detected acceleration along its direction of least acceleration sensitivity. The controller is further configured to generate a third signal indicative of the weighted average. The drilling system further comprises a steering mechanism configured to adjust the selected direction in response to the third signal from the controller.

For purposes of summarizing the invention, certain aspects, advantages and novel features of the invention have been described herein above. It is to be understood, however, that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENT

Making gyroscopic measurements of the orientation and position of a wireline geophysical instrument package using a survey tool or of a drilling tool while drilling using a measurement-while-drilling (MWD) survey tool is a challenging task due in part to the extreme conditions to which the survey tool is exposed. For example, the survey tool is often exposed to accelerations which can influence or disrupt measurements of the angular rotation rate about a sensing axis. Since some gyroscope errors are a function of sensed acceleration, small accelerations (e.g., fractions of the gravitational acceleration of 9.8 meters/sec$^2$) can cause significant angular rate errors. Vibrations can create oscillations in the output from the gyroscope, leading to an unfavorable random error increase. In addition, for gyroscopes using feedback loops, such high frequency vibrations can lead to undesirable errors.

Figure 1:
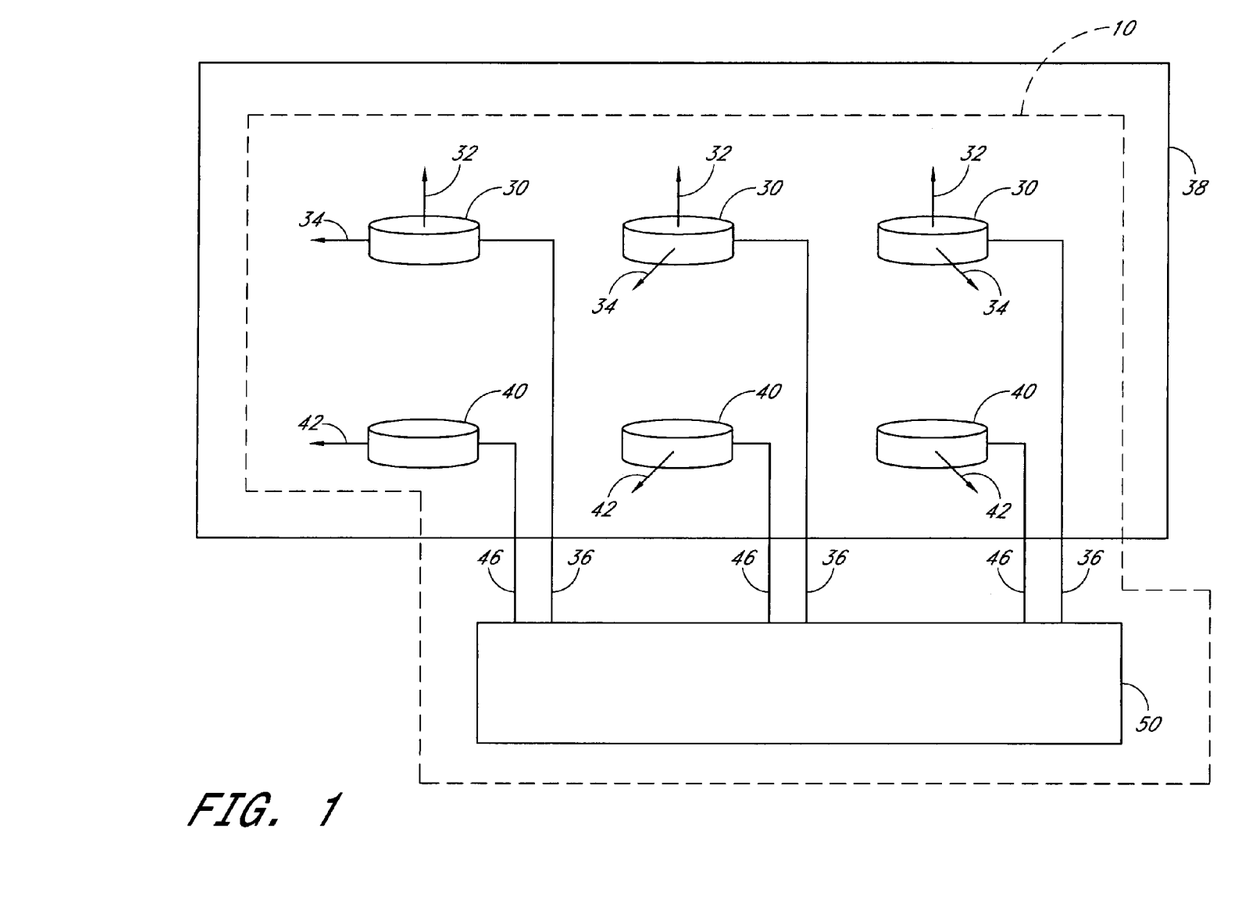
FIG. 1 schematically illustrates a survey tool in accordance with embodiments described herein.

FIG. 1 schematically illustrates a survey tool 10 in accordance with embodiments described herein. The survey tool 10 can be used for determining an orientation of the survey tool as part of a wireline geophysical instrument package or of a drilling tool of a drilling system adapted to drill a borehole into the Earth's surface. The survey tool 10 comprises a plurality of rotation sensors 30. Each rotation sensor 30 has a sensing axis 32 and a direction of least acceleration sensitivity 34. Each rotation sensor 30 is adapted to generate a first signal 36 indicative of a detected angular rotation rate about its sensing axis 32. The plurality of rotation sensors 30 are desirably mounted in a housing 38 with their sensing axes 32 generally parallel to one another and with their directions of least acceleration sensitivity 34 generally non-parallel to one another. The survey tool 10 further desirably comprises a plurality of acceleration sensors 40 mounted in the housing 38. Each acceleration sensor 40 has a sensing direction 42 and is adapted to generate a second signal 46 indicative of detected acceleration along its sensing direction 42. The survey tool 10 further comprises a controller 50 adapted to receive the first signals 36 from the plurality of rotations sensors 30 and the second signals 46 from the plurality of acceleration sensors 40. The controller 50 is adapted to calculate a weighted average of the detected angular rotation rates from the plurality of rotation sensors 30. The weighted average includes the detected angular rotation rate of each rotation sensor 30 about its sensing axis 32 weighted by the detected acceleration along its direction of least acceleration sensitivity 34.

In certain embodiments, the plurality of rotation sensors 30 comprises a plurality of gyroscopes. The gyroscopes utilize the Coriolis effect in which a mass M moving with a velocity v in a reference frame rotating at an angular velocity Ω sees a Coriolis force $F_{Coriolis}=2Mv\times\Omega$. In certain such embodiments, the gyroscopes are "microgyros," which are gyroscopes micromachined on a chip using photolithography and other techniques developed originally for semiconductor fabrication. Exemplary microgyros include, but are not limited to, the PLCC44 vibrating-wheel microgyro available from Robert Bosch GmbH of Stuttgart, Germany, and the ADXRS150 resonating-mass microgyro available from Analog Devices, Inc. of Norwood, Mass. Each of these two microgyros is manufactured as a microchip in a generally square package with a thickness smaller than the lengths of its sides. Certain embodiments of the sensor system 10 can use microgyros of a single type, or can utilize a mixture of types. In the embodiments described below, the Analog Devices-type microgyros are used to describe various features. Persons skilled in the art can recognize that other types of microgyros (or gyroscopes in general) are compatible, alone or in combination with other types, with embodiments described herein.

Figure 2A:
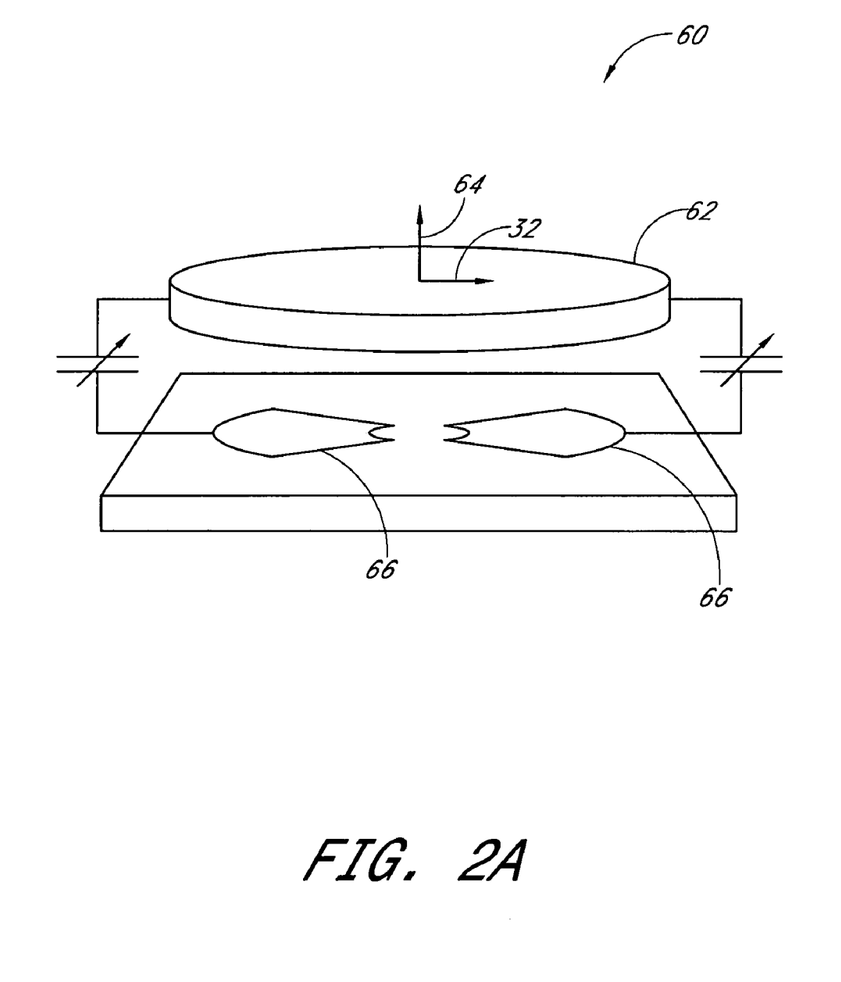
FIG. 2A schematically illustrates a vibrating-wheel microgyro which is sensitive to angular rotation rates about a sensing axis in the microgyro's ground plane.

FIG. 2A schematically illustrates the vibrating-wheel microgyro 60 which is sensitive to angular rotation rates about a sensing axis 32 in the microgyro's ground plane. The microgyro 60 of FIG. 2A includes a wheel 62 with an axis of symmetry 64, about which the wheel 62 is driven to vibrate. Upon rotation about the sensing axis 32 (which is in the plane of the wheel 62), the wheel 62 tilts, and this tilting is measured by detecting the differential capacitance between the wheel 62 and the electrodes 66 under the wheel 62. Such microgyros 60 can also include electronic circuitry to convert the differential capacitance measurements into a first signal indicative of the angular rotation rate about the sensing axis 32. In certain embodiments, such microgyros 60 can be used to detect two in-plane rotational axes with a single vibrating wheel 62. Further description of such vibrating-wheel microgyros 60 is provided by Darrell Teegarden et al. in "How to Model and Simulate Microgyroscope Systems," *IEEE Spectrum*, July 1998, Volume 35, Number 7, pp. 66–75, which is incorporated in its entirety by reference herein.

Figure 2B:
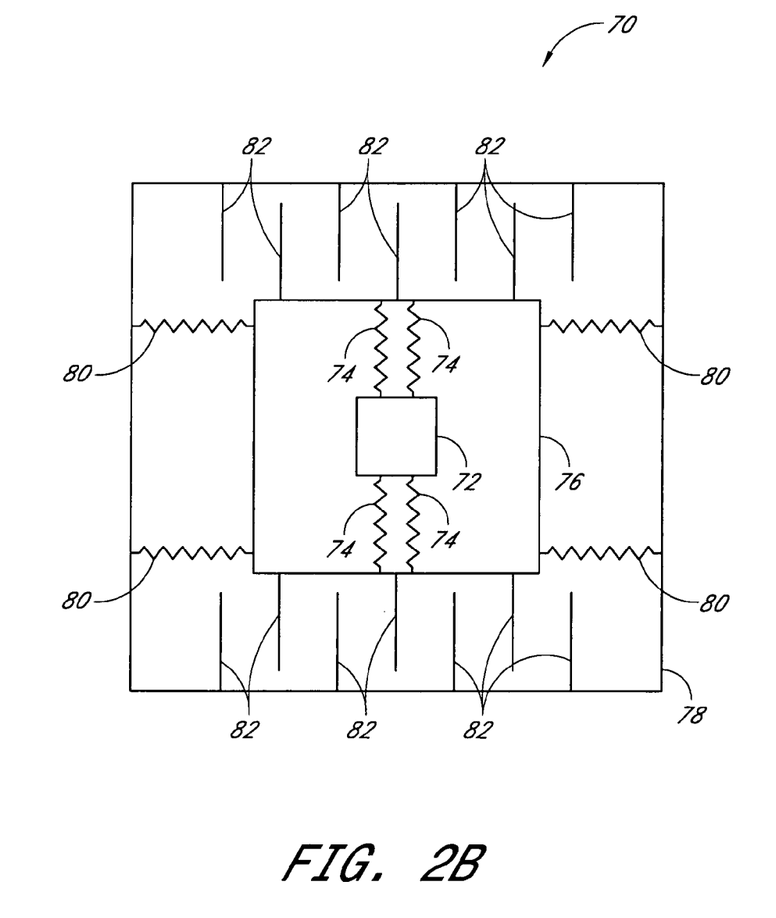
FIG. 2B schematically illustrates a resonating-mass microgyro which is sensitive to angular rates about a sensing axis generally perpendicular to the microgyro's ground plane.

FIG. 2B schematically illustrates the resonating-mass microgyro 70 which is sensitive to angular rates about a sensing axis 32 generally perpendicular to the microgyro's ground plane. The microgyro 70 of FIG. 2B includes a resonating mass 72 coupled by springs 74 to an inner frame 76. The inner frame 76 is coupled to an outer frame 78 by springs 80. Sense fingers 82 on the inner frame 76 and the outer frame 78 are used to capacitively detect displacement of the inner frame 76 relative to the outer frame 78. Such microgyros 70 can also include electronic circuitry to convert the capacitance measurements into a first signal indicative of the angular rotation rate about the sensing axis 32. Further descriptions of such resonant-mass microgyros 70 are provided by Geen et al. in U.S. Pat. Nos. 5,635,638, 5,635,640, and 6,122,961, as well as by J. Geen et al. in "New iMEMS® Angular-Rate-Sensing Gyroscope," *Analog Dialogue*, 2003, Volume 37, Number 3, pp. 1–4, each of which are incorporated in its entirety by reference herein.

In general, microgyros are sensitive to accelerations or vibrations which can cause movements which can be erroneously attributed to being due to Coriolis forces, thereby causing measurement errors. For example, accelerations or vibrations of the resonating-mass microgyro 70 along the direction of relative movement between the inner frame 76 and the outer frame 78 can cause displacements which are erroneously interpreted to be due to changes of the angular rotation rate about the sensing axis 32. Conversely, the resonating-mass microgyro 70 is less sensitive to accelerations or vibrations along the direction perpendicular to the direction of relative movement between the inner frame 76 and the outer frame 78 (i.e., along the resonant displacement direction of the mass 72). For resonating-mass microgyros 70, the resonant displacement direction of the mass 72 is the direction of least acceleration sensitivity. Other types of microgyros, including vibrating-wheel microgyros 60, also have directions of least acceleration sensitivity dictated by the geometry of the microgyro. Microgyros experiencing accelerations or vibrations not due to the Coriolis force thus provide their most reliable measurements when these accelerations or vibrations are along the direction of least acceleration sensitivity.

Figure 3A:
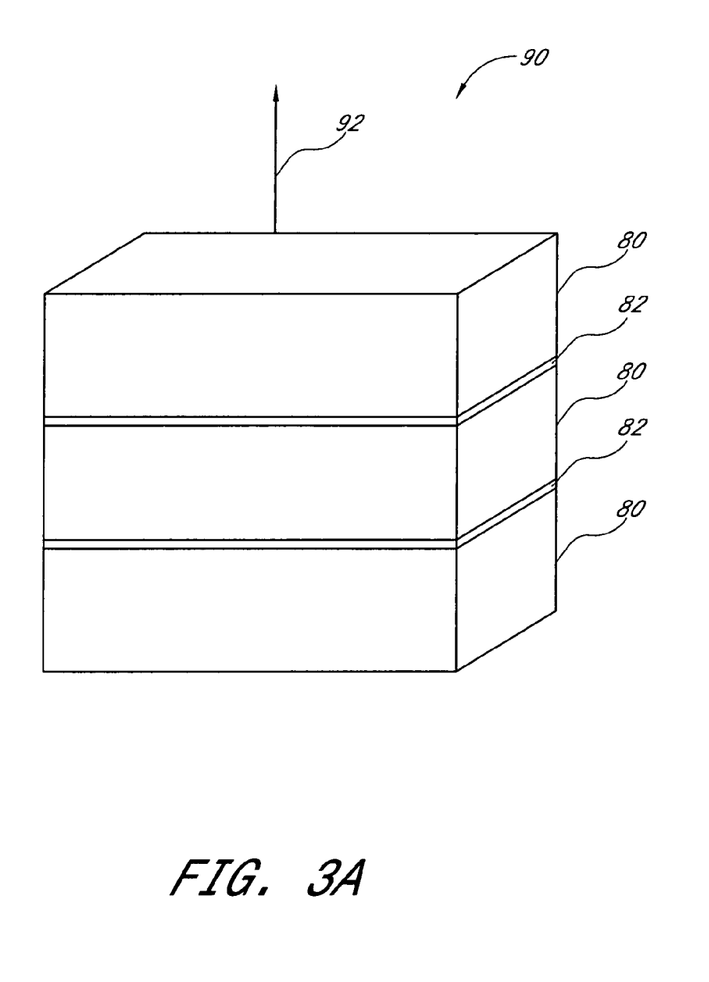
FIGS. 3A and 3B schematically illustrate a plurality of rotation sensors comprising three resonant-mass microgyros in accordance with embodiments described herein.
Figure 3B:
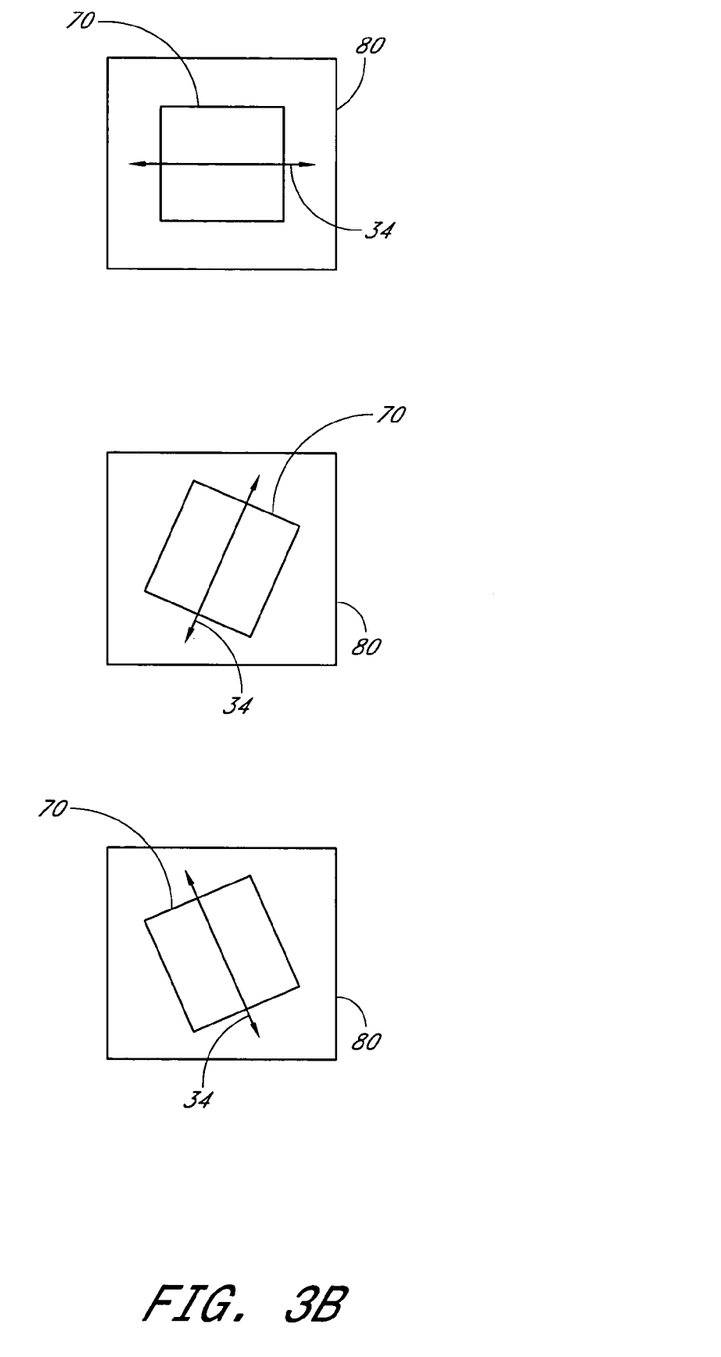

FIGS. 3A and 3B schematically illustrate a plurality of rotation sensors 30 comprising three resonant-mass microgyros 70 in accordance with embodiments described herein. Other embodiments can utilize a plurality of rotation sensors 30 comprising two, four, five, six, or any other number of rotation sensors 30. In certain embodiments, the microgyros 70 of FIGS. 3A and 3B, have packaging which is small enough for use in the tight confines of a borehole (e.g., the Analog Device Part No. ADXRS150 has packaging with dimensions of approximately 7 millimeters by 7 millimeters by 3 millimeters). The smallest inside diameter of a drill pipe is typically less than or equal to approximately two inches.

To maintain their relative positions and orientations to a high degree of accuracy, the rotation sensors 30 can be secured from moving relative to one another under temperature variations, heavy vibrations, and other environmental conditions experienced by the rotation sensors 30. In certain embodiments, as schematically illustrated by FIG. 3A, each microgyro 70 is mounted in a gyro housing 80 and epoxy 82 can be used to couple the gyro housings 80 together into one packed unit 90 of generally cubical form with the sensing axes 32 of the microgyros 70 oriented colinearly. The packed unit 90 can then be described as having a sensing axis 92 aligned with the sensing axes 32 of the microgyros 70. The cubical form is especially suitable for being mounted in the housing 38 along any of the three principle axes of the survey tool 10, or any other axes that may be of interest. In certain embodiments in which the drilling system comprises a MWD tool, the housing 38 of the survey tool 10 is in proximity to the drill bit or the drilling tool (which includes the drill bit), while in other MWD embodiments, the housing 38 of the survey tool 10 is a component of the drilling tool. In wireline embodiments, the housing 38 of the survey tool 10 is insertable into the borehole after the drill string has been removed or is insertable into the drill string itself. Other embodiments utilize other configurations for mounting the rotation sensors 30.

FIG. 3B provides a top view of each of the three microgyros 70 of the packed unit 90 of FIG. 3A to schematically illustrate the orientations of these microgyros 70. The microgyros 70 are rotated relative to one another such that their directions of least acceleration sensitivity 34 are non-parallel to one another. In certain embodiments, the directions of least acceleration sensitivity 34 of the rotation sensors 30 are spread substantially equally over approximately 180 degrees. Since an external vibration can have any direction relative to the packed unit 90, the directions of least acceleration sensitivity 34 of the different microgyros 70 of the packed unit 90 are spread evenly to maximize the likelihood for having at least one microgyro 70 with acceptably low acceleration sensitivity. For example, for the three resonant-mass microgyros 70 of FIG. 3B, the directions of least acceleration sensitivity 34 are at approximately 0 degrees, approximately 60 degrees, and approximately 120 degrees. In such an embodiment, the direction of any acceleration within the microgyro's ground plane is not more than approximately 30 degrees away from one of the directions of least acceleration sensitivity 34.

Advantageously, use of a packed unit 90 with three microgyros 70 can provide the combination of small size and sufficient data measurements to facilitate high accuracy measurements. Where greater accuracy is desired, a packed unit with four microgyros can provide such greater accuracy with limited additional size. Using more rotation sensors 30 can improve the resultant accuracy of the calculated weighted average of the readings from the rotation sensors 30.

Other embodiments can use other relative angles (e.g., using four rotation sensors 30 with directions of least acceleration sensitivity 34 at approximately 0, 45, 90, and 135 degrees). While it is statistically preferable to have the directions of least acceleration sensitivity 34 spread equally over a range of degrees, in other embodiments, the directions of least acceleration sensitivity 34 are not spread equally over a range of degrees.

Figure 4A:
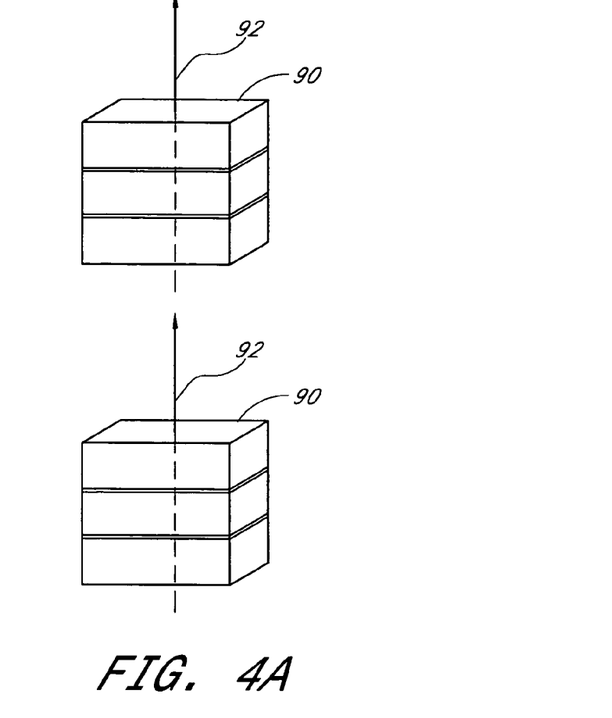
FIGS. 4A and 4B schematically illustrate alternative embodiments of a packed unit of microgyros with sensing axes parallel to the sensing axes of the microgyros of another packed unit.
Figure 4B:
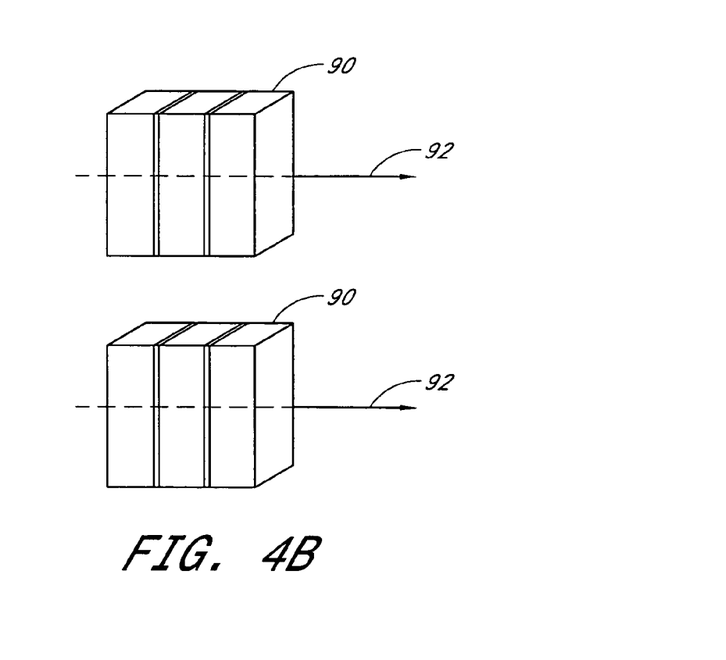

In certain embodiments, multiple packed units 90 may be used with parallel sensing axes 92. FIG. 4A schematically illustrates a pair of packed units 90 with sensing axes 92 of both packed units 90 parallel and colinear with one another. FIG. 4B schematically illustrates a pair of packed units 90 with the sensing axis 92 of one packed unit 90 parallel to the sensing axis 92 of the other packed unit 90.

In certain embodiments, multiple packed units 90 having parallel sensing axes 92 are mounted in the housing 38 but spaced apart from one another. In such embodiments, the packed units 90 can experience different vibration patterns so that when one packed unit 90 undergoes acceleration or vibration, the other packed unit 90 may provide usable measurements. However, such embodiments can also experience bending between the packed units 90 such that the packed units 90 become misaligned relative to one another.

In certain embodiments, each packed unit 90 can have the directions of least acceleration sensitivity 34 of its microgyros 70 spread substantially equally over approximately 180 degrees (i.e., each packed unit 90 covers approximately 180 degrees). In certain other embodiments, each packed unit 90 can have the directions of least acceleration sensitivity 34 of its microgyros 70 spread over less than 180 degrees, but the directions of least acceleration sensitivity 34 of all the microgyros 70 are spread substantially equally over approximately 180 degrees (i.e., the sum of the packed units 90 covers approximately 180 degrees).

In certain embodiments, the plurality of acceleration sensors 40 comprises accelerometers each of which provides a signal indicative of detected acceleration along its sensing direction 42. The acceleration sensors 40 can be conventional accelerometers commonly used in survey tools, or can be micromachined accelerometers. Exemplary accelerometers include, but are not limited to, those described by N. Yazdi et al. in "Micromachined Inertial Sensors," *Proc. of the IEEE,* August 1998, Vol. 86, No. 8, pp. 1640–1659, which is incorporated in its entirety by reference herein.

In certain embodiments, the plurality of acceleration sensors 40 includes enough accelerometers to measure the two-dimensional acceleration in the plane defined by the directions of least acceleration sensitivity 34 of the rotation sensors 30. In such embodiments, the acceleration in this plane detected by the plurality of acceleration sensors 40 is decomposed into its components along the directions of least acceleration sensitivity 34 of the rotation sensors 30. In certain embodiments, the plurality of acceleration sensors 40 are mounted in the housing 38 with their sensing directions 42 generally parallel to the directions of least acceleration sensitivity 34 of the plurality of rotation sensors 30. In such embodiments, the accelerations detected by the acceleration sensors 40 correspond to the components of the detected acceleration along the directions of least acceleration sensitivity 34 of the plurality of rotation sensors 30. In other embodiments, the plurality of acceleration sensors 40 are mounted in the housing 38 such that vector analysis can be used to determine the components of the detected acceleration along the directions of least acceleration sensitivity 34 of the plurality of rotation sensors 30. Other embodiments utilize other configurations for mounting the acceleration sensors 40.

In certain embodiments, the controller 50 comprises a microprocessor adapted to receive the first signals 36 from the plurality of rotations sensors 30 and the second signals 46 from the plurality of acceleration sensors 40. The controller 50 of certain embodiments comprises sufficient memory to facilitate the calculations. In certain embodiments, the controller 50 is wholly or partly mounted in the housing 38. In other embodiments, the controller 50 is positioned away from the housing 38, but is coupled to the rotation sensors 30 and the acceleration sensors 40 mounted in the housing 38.

In certain embodiments, the survey tool 10 is part of a rotatably steerable drilling system which is configured to adjust the direction of drilling in response to signals from the controller 50 of the survey tool 10. In certain such embodiments, the rotatably steerable drilling system comprises a control system which is coupled to a steering mechanism for the rotatably steerable drill string. In certain embodiments, the control system comprises the controller 50, while in other embodiments, the control system receives signals from controller 50. The control system sends control signals to the steering mechanism in response to the data from the survey tool 10.

The controller 50 is adapted to calculate a weighted average of the detected angular rotation rates from the plurality of rotation sensors 30. The weighted average includes the detected angular rotation rate of each rotation sensor 30 about its sensing axis 32 weighted by the detected acceleration along its direction of least acceleration sensitivity 34. The resultant weighted average angular rotation rate $R_p$ can be expressed by the following equations:

$$R_p = \frac{\sum_i (R_i * W_i)}{\sum_i W_i}, \text{ and} \quad (1)$$

$$W_i = \left(\frac{A_i}{A_g}\right)^2 \quad (2)$$

where $R_i$ is the measured angular rotation rate from rotation sensor i, $A_g$ is the ground plane acceleration, and $A_i$ is the component of the ground plane acceleration along the direction of least acceleration sensitivity of rotation sensor i.

In certain embodiments, the first signals 36 are provided continually by the rotation sensors 30 to the controller 50 and the second signals 46 are provided continually by the acceleration sensors 40 to the controller 50. In certain such embodiments, the controller 50 accesses the first signals 36 and the second signals 46 at a discrete frequency. Due to possible high frequency vibrations, the discrete frequency of the controller 50 is preferably chosen to be high. While the chosen discrete frequency will be limited by the electronics, it is preferably in the kilohertz range. For example, the controller 50 can access the first signals 36 from each of the three rotation sensors 30 of a packed unit 90 and can access the second signals 46 from each of the three acceleration sensors 40 corresponding to these rotation sensors 30. The time period over which the rate measurement is made (i.e., the time elapsed from accessing the first measurement to accessing the last measurement used for calculating a weighted average angular rotation rate) is defined as an "epoch." The controller 50 then calculates a weighted average angular rotation rate for each epoch. In certain embodiments, it is desirable to have epochs as short as possible so as to provide frequent evaluations of the weighted average angular rotation rate.

In certain embodiments utilizing three or more rotation sensors 30, the standard deviation can be used to provide real-time quality control of the measured angular rotation rate. The term "real-time quality control" is used broadly herein to mean selective exclusion from the calculation of apparently-erroneous measurements from one or more rotation sensors 30 as the measurements are being made. The standard deviation $SD_p$ for the weighted average angular rotation rate $R_p$ can be estimated by the following equation:

$$SD_p = \sqrt{\frac{\sum_i W_i * (R_i - R_p)^2}{(N-1) * \sum_i W_i}} \quad (3)$$

where N is the number of rotation sensors 30 included in the weighted average angular rotation rate. In certain embodiments, quality control calculations are performed within substantially simultaneously with the corresponding measurements, while in other embodiments, the calculations are performed at regular intervals (for example, every second, every few seconds, or every ten seconds).

In certain embodiments, a rotation sensor 30 not satisfying a predetermined condition is excluded from the weighted average angular rotation rate $R_p$. Such rotation sensors 30 may be malfunctioning, e.g., due to experiencing excessive acceleration, temperatures, etc. In certain such embodiments, the predetermined condition is provided by the following equation:

$$|R_i - R_p| < T * SD_p \quad (4)$$

where T is a tolerance factor, which in certain embodiments equals 3, and in other embodiments equals 5.

The tolerance factor of certain embodiments is taken from the normal distribution. For example, 50% of the measurements will be within $\pm 0.67\sigma$ of the mean of the distribution, 95% of the measurements will be within $\pm 1.96\sigma$ of the mean of the distribution, and 99.9% of the measurements will be within $\pm 3.29\sigma$ of the mean of the distribution. The tolerance factor in such embodiments is chosen depending on the desired tolerance for getting a result offset by accepting a bad measurement, or for throwing away a good measurement. A low tolerance number corresponds to avoiding using bad measurements and a high tolerance number corresponds to avoiding excluding good measurements.

If one or more rotation sensors 30 are excluded, a new weighted average angular rotation rate $R_p$ can be calculated using only the remaining rotation sensors 30. If there are three or more remaining rotation sensors 30, a new standard deviation $SD_p$ can be calculated using only the remaining rotation sensors 30. In certain embodiments, the readings from the remaining rotation sensors 30 can then be tested using the new standard deviation in Equation 4.

In certain other embodiments, the rotation sensor 30 furthest from the weighted average angular rotation rate $R_p$ is excluded, and the weighted average is recalculated. In alternative embodiments, the second signals 46 from the acceleration sensors 40 can be used to determine which rotation sensors 30 to exclude from the weighted average angular rotation rate $R_p$. For example, if an acceleration larger than a predetermined magnitude is detected along a direction of particular sensitivity of one of the rotation sensors 30 (e.g., perpendicular to the direction of least acceleration sensitivity 34), that rotation sensor 30 can be excluded from the calculation of the weighted average angular rotation rate $R_p$. In certain embodiments, the magnitude of acceleration that would be enough to exclude a rotation sensor 30 from the calculation is set after testing the survey tool 10.

In still other embodiments, other parameters can be used to select which rotation sensors 30 to exclude from the weighted average angular rotation rate $R_p$. For example, in embodiments in which each rotation sensor 30 has a corresponding temperature sensor, the rotation sensor 30 can be excluded if its temperature is above a predetermined maximum value. Similarly, the rotation sensor 30 can be excluded if its temperature is below a predetermined minimum value. In either case, the weighted average is recalculated by excluding the detected angular rotation rates obtained from the rotation sensors with temperatures above the predetermined maximum value or below the predetermined minimum value.

In embodiments in which two or more packed units 90 are used with their sensing axes 92 parallel to a principle axis, a weighted average angular rotation rate $R_\alpha$ can be calculated for the principle axis based on the weighted average angular rotation rates $R_p$ of the packed units 90 using the following equation:

$$R_\alpha = \frac{\sum_j (R_{p,j} * W_j)}{\sum_j W_j}, \text{ and} \quad (5)$$

$$W_j = \left(\frac{SD_{p,j} N_{e,j}}{N}\right)^2 \quad (6)$$

where $R_{pj}$ is the weighted average angular rotation rate of packed unit j, $SD_{pj}$ is the standard deviation of packed unit j, N is the total number of rotation sensors in each packed unit, and $N_{ej}$ is the number of rotation sensors 30 that are used in each packed unit j. Real-time quality control of the measured angular rotation rate can be provided by excluding packed units 90 using criteria similar to those described above in relation to excluding rotation sensors 30.

In certain embodiments, predictive filtering (e.g., Kalman-filtering calculations) can be used to calculate the averaged angular rotation rate. Kalman filtering is a predictive filtering technique developed for statistical adjustments of navigational measurements with a time-dependent position vector. In such Kalman filtering, the expected position and speed at a given moment can be calculated using a measured position and velocity at an earlier moment. Upon measuring the position and velocity at the given moment, the measured and expected values can be used to continue calculating later-expected values of the position and velocity and monitoring the behavior of the system.

A similar predictive filtering technique can also be applied to the data generated by a plurality of rotation sensors 30. Instead of the time-dependent position vector and utilizing the full navigational measurements of traditional Kalman filtering, embodiments described herein utilizing Kalman filtering have a time-dependent angular rotation rate and utilize angular rotation sensor measurements and accelerometer measurements. Additional information regarding Kalman filtering is provided by U.S. Pat. No. 4,537,067 to Sharp et al., U.S. Pat. No. 4,987,684 to Andreas et al., U.S. Pat. No. 6,381,858 B1 to Shirasaka, and U.S. Pat. No. 6,453,239 B1 to Shirasaka et al., each of which is incorporated in its entirety by reference herein.

In certain embodiments, a multistate Kalman filter can be used. The states used can vary in different implementations of the filtering. For example, in certain embodiments, it is desirable to control the bias drift of the microgyros due to accuracy demands, etc. The bias drift is typically the greatest source of error in a gyroscopic measurement. The bias varies with time, and can not be totally compensated for by predetermined calibration correction terms. Bias correction based on a real-time bias estimate can be significantly better and result in a more accurate angular rate measurement. The states (i.e., unknowns) of the multistate Kalman filter can include, but are not limited to, the angular rotation rate about the sensing axis, the rate of change of the angular rotation rate, the bias of each used microgyro, the rate of change of these biases, and small corrections to calibration terms (e.g., scale factor). In embodiments in which three or more packed units 90 or three or more multiple packed unit axes are used, in addition to the states listed above, the multistate Kalman filter can also treat the azimuth, inclination, high-side toolface, and azimuthal toolface as unknowns to be calculated. Such embodiments can also be self-monitoring and capable of avoiding divergence of the calculation by resetting or stopping the calculation upon detection of predetermined conditions, as described below.

In certain embodiments, measurements of a given epoch are run through the real-time quality control method described above to detect measurements to be excluded from the calculation. The remaining measurements can then be inputted into the Kalman filter. In certain embodiments, the Kalman filter includes the following matrices:

$X_k$=vector matrix of the states of the filter at epoch k;
$\Sigma_{s,k}$=covariance matrix of the states at epoch k;
$A_k$=matrix linking the states and the measurements;
$W_k$=vector matrix with the measurement rate offsets at epoch k;
$\Sigma_{m,k}$=covariance matrix of the measurements at epoch k;
$\Phi_k$=matrix describing the transition from epoch (k−1) to epoch k; and
$\Sigma_{\Phi,k}$=covariance matrix of the transition from epoch (k−1) to epoch k.

In such embodiments, the Kalman filtering procedure can use the following equations:

$$X_k = \Phi_k * X_{k-1}; \quad (7)$$

$$\Sigma_{s,k} = \Phi_k * \Sigma_{s,k-1} * \Phi_k^T * \Sigma_{101\ ,k}; \quad (8)$$

$$X_k = X_k - \Sigma_{s,k} * A_k^T * (\Sigma_{m,k} + A_k * \Sigma_{s,k} * A_k^T)^{-1} * (A_k * X_k + W_k); \text{ and} \quad (9)$$

$$\Sigma_{s,k} = \Sigma_{s,k} - [\Sigma_{s,k} * A_k^T * (\Sigma_{m,k} + A_k * \Sigma_{s,k} * A_k^T)^{-1}] * A_k * \Sigma_{s,k}. \quad (10)$$

In certain embodiments, the controller 50 is adapted to monitor the Kalman filter calculation to provide advantageous capabilities. Certain such embodiments allow the controller 50 to avoid divergence of the Kalman filter calculation. Upon occurrence of a predetermined condition, the controller 50 can stop the Kalman filter calculation or reset the calculation to a new state and restart. Examples of predetermined conditions include, but are not limited to, any of the states exceeding a preset maximum level, any of the states below a preset minimum level, and the standard deviation of any of the states exceeding a preset maximum level. In other embodiments, the covariance matrices can provide helpful information to determine whether the Kalman filter calculation begins to diverge.

In other embodiments, the controller 50 is adapted to provide active gross error control by monitoring the rotation sensors 30 over time. The controller 50 can then exclude those rotation sensors 30 which are apparently having difficulties providing accurate measurements. Similarly, in other embodiments, the controller 50 is adapted to monitor the acceleration sensors 40 over time. Such embodiments advantageously increase the time between fatal failures of the survey tool 10, which can be particularly important in oil and gas exploration where delays can be costly.

In other embodiments, the controller 50 is adapted to provide real-time tuning of the rotation sensors 30. The term "real-time tuning" is used broadly herein to mean adjusting the gain of the rotation sensors 30 while measurements are being made. Existing gyroscopes have limited ranges of high accuracy angular rotation rate measurements. Due to the large rate difference between the Earth's rotation (a few degrees per hour) and the fast rotation of the drilling tool 20 (hundreds of degrees per second), existing gyroscopes are unable to provide high accuracy angular rotation rate measurements across the whole range of measurements. By monitoring the Kalman filter calculation, the controller 50 can characterize the present signal bandwidth and calculate an expected noise level. This noise level can be used by the controller 50 to adjust the gain of the rotation sensors 30, thereby improving the accuracy.

Embodiments described herein which use packed units 90 of microgyros can be made more economically than existing survey tools which use spinning-wheel or ring-laser gyroscopes. Such embodiments can utilize more than the minimum number of sensitive gyroscope axes (e.g., more than one gyroscope per sensitive gyroscope axis), thereby increasing the accuracy of the resultant measurements. In certain embodiments, the directions of least acceleration sensitivity 34 of the rotation sensors 30 of each packed unit 90 are substantially equally spread out. In such embodiments in which the packed unit 90 comprises four or more microgyros, the controller 50 can utilize the Kalman filter calculation to detect whether one of the microgyros is providing erroneous measurements, remove the erroneous microgyro measurement from the calculation, and provide an angular rotation rate measurement utilizing the remaining microgyros with sufficient reliability.

Certain embodiments can provide real-time calibration based on the multiple-state Kalman filtering. For two or more packed units 90 having their sensing axes 32 substantially parallel to one another, any misalignments between the packed units 90 (e.g., due to non-systematic movements) can result in their sensing axes 32 not being parallel. As the measurements continue, the controller 50 can track these misalignments and calibrate them mathematically in real-time to reduce or eliminate their contribution to the average angular rotation rate. In certain embodiments, the misalignment will be one of the unknown states of the Kalman filter. In addition, any biases of the microgyros can be calibrated over time by the controller 50 and incorporated appropriately into the measurements of the angular rotation rate. In certain embodiments, the bias will be one of the unknown states of the Kalman filter. In such embodiments, the initial measurements may have relatively high uncertainty, but as the measurements continue, the uncertainty can be reduced using information from the covariance matrices.

EXAMPLE OF KALMAN FILTER IMPLEMENTATION

To illustrate the implementation of the Kalman filter calculation, an exemplary embodiment has two microgyros packed together with their sensing axes 32 colinear with one another. In this exemplary embodiment, the following assumptions have been made:

1. The first microgyro ($MG_a$) is perfectly mounted, and measures the full tool axis (z-axis) angular rotation rate.
2. The second microgyro ($MG_b$) is inaccurately mounted to be misaligned with an angle M with respect to the tool axis.
3. Each microgyro has an unknown time-dependent bias error ($B_a(t)$ and $B_b(t)$, respectively) for which it is desirable to correct.
4. The frequency of sampling the measurements from the microgyros is high enough to neglect angular accelerations between subsequent samplings.
5. The combined unit is exposed to a tool axis angular rate $\omega_z$, which is a function of time.
6. The tool axis angular rate $\omega_z(t)$ is the principal unknown quantity, and the desired measured quantity.
7. The two microgyro biases, $B_a$ and $B_b$, and M are the secondary unknown quantities.
8. The unknown quantities can be expressed as a vector: $X(t)=[\omega_z(t) B_a(t) B_b(t) M]^T$.

All four of the parameters $\omega_z$, $B_a$, $B_b$, and M are unknown upon turning on the survey tool. The initial values of these unknowns do not have to be correct, but the magnitude of the uncertainty is preferably known. The initial value of $\omega_{z0}$ can be set to be equal to the average of the first valid outputs from $MG_a$ ($\Omega_{a0}$) and $MG_b$ ($\Omega_{b0}$). The uncertainty (e.g., standard deviation) of this initial $\omega_{z0}$ is not known, but can without significant loss of accuracy be set to 71% of the bias stability ($\sigma_B$) given by the microgyro manufacturer. Since $B_a$, $B_b$, and M have a statistical expectation of zero, this is the initial value chosen for these unknowns ($B_{a0}=B_{b0}=M_0=0$). The uncertainties are also unknown, but it is possible to create sufficiently accurate estimations. The bias stability $\sigma_B$ is an obvious candidate for the initial uncertainties of $B_{a0}$ and $B_{b0}$. These two initial values will be correlated with the initial $\omega_{z0}$, which can be accounted for. To find the uncertainty in $M_0(\sigma_M)$ is more complicated, and can be based on experience. In certain embodiments in which the uncertainty in $M_0$ is small (e.g., $\sigma_M$ is typically less than 1–2 degrees), using $\sigma_M=1$ is sufficient.

The initial state vector and its covariance matrix (which accounts for the correlation between the initial values) are then given by the following:

$$X_0 = \left[ \frac{(\Omega_{a0}+\Omega_{b0})}{2} \quad 0 \quad 0 \quad 0 \right]^T ; \text{and} \tag{11}$$

$$\sum_{s,0} = \begin{bmatrix} \frac{\sigma_B^2}{2} & \frac{-\sigma_B^2}{2.8} & \frac{-\sigma_B^2}{2.8} & 0 \\ \frac{-\sigma_B^2}{2.8} & \sigma_B^2 & 0 & 0 \\ \frac{-\sigma_B^2}{2.8} & 0 & \sigma_B^2 & 0 \\ 0 & 0 & 0 & \sigma_M^2 \end{bmatrix}. \tag{12}$$

The predicted state vector at the first update (epoch 1) after time $\Delta T=(1/\text{frequency})$ is then $X'_1=\Phi_1 * X_0$, where $\Phi_1$ is a matrix extrapolating the initial states to epoch 1. In embodiments with a high measurement frequency, this matrix $\Phi_1$ can be represented by a unit matrix with 4×4 dimensions. This matrix $\Phi_1$ will become more complicated if the orientation (e.g., integrated angle), angular accelerations, time-dependent biases, time-dependent misalignments, etc. are modeled.

The covariance matrix of the predicted state vector at epoch 1 is given by the following:

$$\Sigma'_{s,1}=\Phi_1 * \Sigma_{s,0} * \Phi_1^T + \Sigma_{\Phi,1}; \tag{13}$$

where the transition covariance matrix $\Sigma_{\Phi,1}$ is given by the following:

$$\sum_{\Phi,1} = \begin{bmatrix} \sigma_\omega^2 & 0 & 0 & 0 \\ 0 & \sigma_{Bd}^2 & 0 & 0 \\ 0 & 0 & \sigma_{Bd}^2 & 0 \\ 0 & 0 & 0 & 0 \end{bmatrix}; \text{ and} \quad (14)$$

where $\sigma_{107} = \frac{1}{3}*(\text{maximum expected angular acceleration}) * \Delta T$ and $\sigma_{Bd} = \frac{1}{3}*(\text{maximum expected bias drift rate})*\Delta T$. This transition covariance matrix will become more complicated if the misalignment is modeled as a time-dependent state (e.g., due to variable bending of the housing induced by the variable borehole geometry).

At epoch 1, a new set of measurements from $MG_a$ and $MG_b$ are obtained ($\Omega_{a1}$ and $\Omega_{b1}$). These two measurements can be expressed in terms of the states at epoch 1 plus measurement errors ($\epsilon_a$ and $\epsilon_b$):

$$\Omega_{a1} = \omega_{z1} + B_{a1} + \epsilon_a; \text{ and} \quad (15)$$

$$\Omega_{b1} = \omega_{z1}*\cos(M_1) + B_{b1} + \epsilon_b. \quad (16)$$

This is a non-linear equation system, which for simplicity, is made linear through a Taylor series expansion around the predicted states of epoch 1:

$$\Omega_{a1} = \omega'_{z1} + B'_{a1} + d\omega_{z1} + dB_{a1} + \epsilon_a; \text{ and} \quad (17)$$

$$\Omega_{b1} = \omega'_{z1}*\cos(M'_1) + B'_{b1} + d\omega_{z1}*\cos(M'_1) - \omega'_{z1}*\sin(M'_1)*dM_1 + dB_{b1} + \epsilon_b. \quad (18)$$

In matrix form:

$$A_1 * dX_1 + W_1 = E; \quad (19)$$

$$dX_1 = [d\omega_{z1} dB_{a1} dB_{b1} dM_1]^T; \quad (20)$$

$$A_1 = \begin{bmatrix} 1 & 1 & 0 & 0 \\ \cos(M'_1) & 0 & 1 & -\omega'_{z1}*\sin(M'_1) \end{bmatrix}; \text{ and} \quad (21)$$

$$W_1 = \begin{bmatrix} \omega'_{z1} + B'_{a1} - \Omega_{a1} \\ \omega'_{z1}*\cos(M'_1) + B'_{b1} - \Omega_{b1} \end{bmatrix}; \quad (22)$$

where $A_1$ is the design matrix, $dX_1$ is the vector of small corrections to the predicted states, W is the constant vector at epoch 1, E is the error vector, and $X'_1 = [\omega'_{z1} B'_{a1} B'_{b1} M'_1]^T$ is the predicted state vector.

The states $\Omega_{a1}$ and $\Omega_{b1}$ at epoch 1 are both affected by measurement noise, as indicated by the error vector. While the amount of noise is unknown, expected measurement standard deviations for one standalone angular rate measurement ($\sigma_r$) can be supplied by the manufacturer of the microgyro. The value for $\sigma_r$ can be improved through experience using subsequent measurements. The measurement covariance matrix for the measurements at epoch 1 can then be expressed as:

$$\sum_{M,1} = \begin{bmatrix} \sigma_r^2 & 0 \\ 0 & \sigma_r^2 \end{bmatrix}. \quad (23)$$

A solution for the small state corrections at epoch 1 can then be found through a least-squares adjustment. This adjustment comprises finding the $dX_1$ vector with the minimum matrix product $E^T * \Sigma_M^{-1} * E$. The measured state vector at epoch 1 will then be given by: $X_1'' = X_1' + dX_1$. There are two solutions for the state vector at epoch 1, X1' and X1". The optimal estimate for the state vector at epoch 1 will be a covariance-based weighted average of these two solutions. It is possible to merge the least-squares adjustment and the weighted average into one calculation step. This merging has the advantage that it will work even if there are too few measurements present to give a measurement-based least-squares solution by itself. The state vector at epoch 1 is through the combined method given by:

$$X_1 = X'_1 - \Sigma'_{s,1} * A_1^T * (\Sigma_{M,1} + A_1 * \Sigma'_{s,1} * A_1^T)^{-1} * (A_1 * X'_1 * W_1). \quad (24)$$

The associated covariance matrix, which is a measure for the accuracy of the estimated states is given by:

$$\Sigma_{s,1} = \Sigma'_{s,1} - \Sigma'_{s,1} * A_1^T * (\Sigma_{M,1} + A_1 * \Sigma'_{s,1} * A_1^T)^{-1} * (A_1 * \Sigma'_{s,1}). \quad (25)$$

The same calculation can be repeated at epoch 2, then for epoch 3, and so on. The matrices, vectors, and equations for epoch k are given by:

$$\Phi_k = \Phi_{k-1}; \quad (26)$$

$$\Sigma_{\Phi,k} = \Sigma_{\Phi,k-1}; \quad (27)$$

$$X'_k = \Phi_k * X_{k-1}; \quad (28)$$

$$\Sigma'_{s,k} = \Phi_k * \Sigma_{s,k-1} * \Phi_k^T + \Sigma_{\Phi,k}; \quad (29)$$

$$X'_k = [\omega'_{zk} B'_{ak} B'_{bk} M'_k]^T; \quad (30)$$

$$A_k = \begin{bmatrix} 1 & 1 & 0 & 0 \\ \cos(M'_k) & 0 & 1 & -\omega'_{zk}*\sin(M'_k) \end{bmatrix}; \quad (31)$$

$$W_k = \begin{bmatrix} \omega'_{zk} + B'_{ak} - \Omega_{ak} \\ \omega'_{zk}*\cos(M'_k) + B'_{bk} - \Omega_{bk} \end{bmatrix}; \quad (32)$$

$$\Sigma_{M,k} = \Sigma_{M,k-1}; \quad (33)$$

$$X_k = X'_k - \Sigma'_{s,k} * A_k^T * (\Sigma_{M,k} + A_k * \Sigma'_{s,k} * A_k^T)^{-1} * (A_k * X'_k * W_k); \text{ and} \quad (34)$$

$$\Sigma_{s,k} = \Sigma'_{s,k} - \Sigma'_{s,k} * A_k^T * (\Sigma_{M,k} + A_k * \Sigma'_{s,k} * A_k^T)^{-1} * (A_k * \Sigma'_{s,k}). \quad (35)$$

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A survey tool for determining an orientation of the survey tool within a borehole, the survey tool comprising:
a plurality of rotation sensors, each rotation sensor having a sensing axis and a direction of least acceleration sensitivity, each rotation sensor adapted to generate a first signal indicative of a detected angular rotation rate about its sensing axis, the plurality of rotation sensors mounted in a housing with their sensing axes generally parallel to one another and with their directions of least acceleration sensitivity generally non-parallel to one another;

a plurality of acceleration sensors mounted in the housing, each acceleration sensor having a sensing direction, each acceleration sensor adapted to generate a second signal indicative of detected acceleration along its sensing direction; and a controller adapted to receive a first signal from each of the plurality of rotation sensors and a second signal from each of the plurality of acceleration sensors, the controller adapted to calculate a weighted average of the detected angular rotation rates from the plurality of rotation sensors, the weighted average including the detected angular rotation rate of each rotation sensor about its sensing axis weighted by the detected acceleration along its direction of least acceleration sensitivity.

2. The survey tool of claim 1, wherein the plurality of rotation sensors comprises a plurality of microgyros.

3. The survey tool of claim 2, wherein the plurality of microgyros comprises at least one vibrating-wheel microgyro.

4. The survey tool of claim 2, wherein the plurality of microgyros comprises at least one resonating-mass microgyro.

5. The survey tool of claim 2, wherein the microgyros comprise a packed unit with the microgyros stacked on one another.

6. The survey tool of claim 5, wherein the sensing axes of the microgyros of the packed unit are generally parallel to one another.

7. The survey tool of claim 2, wherein the microgyros comprise a plurality of packed units, and wherein the sensing axes of the microgyros of each packed unit are generally colinear to one another and to the sensing axes of the microgyros of the other packed units.

8. The survey tool of claim 7, wherein at least two of the plurality of packed units are spaced apart from one another in the housing.

9. The survey tool of claim 7, wherein the directions of least acceleration sensitivity of the microgyros of each packed unit are spread substantially equally over approximately 180 degrees.

10. The survey tool of claim 1, wherein the sensing axis and the direction of least acceleration sensitivity of each rotation sensor are generally perpendicular to one another.

11. The survey tool of claim 1, wherein the survey tool is part of a wireline geophysical instrument package.

12. The survey tool of claim 1, wherein the survey tool is part of a drilling system adapted to drill the borehole.

13. The survey tool of claim 12, wherein the drilling system comprises a drilling tool, and the housing of the survey tool is in proximity to the drilling tool.

14. The survey tool of claim 12, wherein the drilling system comprises a drilling tool, and the housing of the survey tool is a component of the drilling tool.

15. The survey tool of claim 12, wherein the drilling system comprises a measurement-while-drilling (MWD) drilling tool.

16. The survey tool of claim 1, wherein the plurality of rotation sensors comprises at least three microgyros.

17. The survey tool of claim 1, wherein the directions of least acceleration sensitivity of the plurality of rotation sensors are spread evenly from one another by approximately 60 degrees.

18. The survey tool of claim 1, wherein the directions of least acceleration sensitivity of the plurality of rotation sensors are spread evenly from one another by approximately 45 degrees.

19. The survey tool of claim 1, wherein the directions of least acceleration sensitivity of the plurality of rotation sensors are spread unevenly over a range of degrees.

20. The survey tool of claim 1, wherein the plurality of acceleration sensors are mounted with their sensing directions generally parallel to the directions of least acceleration sensitivity of the plurality of rotation sensors.

21. The survey tool of claim 1, wherein the controller is at least partially positioned within the housing.

22. The survey tool of claim 1, wherein the controller is positioned away from the housing.

23. The survey tool of claim 1, wherein the controller accesses the first signals and the second signals at a discrete frequency.

24. A control system of a rotatably steerable drilling system configured to drill in a selected drilling direction of a plurality of drilling directions, the control system configured to adjust the selected drilling direction, the control system comprising:

a plurality of rotation sensors, each rotation sensor having a sensing axis and a direction of least acceleration sensitivity, each rotation sensor adapted to generate a first signal indicative of a detected angular rotation rate about its sensing axis, the plurality of rotation sensors mounted in a housing with their sensing axes generally parallel to one another and with their directions of least acceleration sensitivity generally non-parallel to one another;

a plurality of acceleration sensors mounted in the housing, each acceleration sensor having a sensing direction, each acceleration sensor adapted to generate a second signal indicative of detected acceleration along its sensing direction; and a controller adapted to receive a first signal from each of the plurality of rotation sensors and a second signal from each of the plurality of acceleration sensors, the controller adapted to calculate a weighted average of the detected angular rotation rates from the plurality of rotation sensors, the weighted average including the detected angular rotation rate of each rotation sensor about its sensing axis weighted by the detected acceleration along its direction of least acceleration sensitivity.

25. A method of determining an orientation of a survey tool within a borehole, the method comprising:

providing a plurality of rotation sensors, each rotation sensor having a sensing axis and a direction of least acceleration sensitivity, the plurality of rotation sensors having their sensing axes generally parallel to one another and their directions of least acceleration sensitivity generally non-parallel to one another;

obtaining a detected angular rotation rate from each rotation sensor, each detected angular rotation rate being about the sensing axis of the corresponding rotation sensor;

obtaining a detected acceleration along the directions of least acceleration sensitivity of each of the rotation sensors; and calculating a weighted average of the detected angular rotation rates from the plurality of rotation sensors, the weighted average including the detected angular rotation rate of each rotation sensor about its sensing axis weighted by the detected acceleration along its direction of least acceleration sensitivity.

26. The method of claim 25, further comprising providing real-time quality control of the weighted average.

27. The method of claim 26, wherein providing real-time quality control comprises calculating a standard deviation of the weighted average and excluding angular rotation rate measurements that are more than a predetermined number of standard deviations from the weighted average.

28. The method of claim 27, wherein the predetermined number of standard deviations is three.

29. The method of claim 26, wherein providing real-time quality control comprises determining which detected angular rotation rate is furthest from the weighted average and recalculating the weighted average by excluding the furthest detected angular rotation rate.

30. The method of claim 26, wherein each rotation sensor has a direction of most acceleration sensitivity and providing real-time quality control comprises determining which rotation sensors have undergone an appreciable acceleration along its direction of most acceleration sensitivity and recalculating the weighted average by excluding the detected angular rotation rates from said rotation sensors.

31. The method of claim 26, wherein providing real-time quality control comprises determining which rotation sensors are at temperatures above a predetermined maximum temperature, and recalculating the weighted average by excluding the detected angular rotation rates obtained from said rotation sensors.

32. The method of claim 26, wherein providing real-time quality control comprises determining which rotation sensors are at temperatures below a predetermined minimum temperature, and recalculating the weighted average by excluding the detected angular rotation rates obtained from said rotation sensors.

33. The method of claim 25, further comprising active gross error control by monitoring the rotation sensors over time, determining which rotation sensors are having difficulties providing accurate measurements, and recalculating the weighted average by excluding the detected angular rotation rates from said rotation sensors.

34. The method of claim 25, wherein calculating the weighted average comprises using predictive filtering.

35. The method of claim 34, wherein using predictive filtering comprises using Kalman filtering.

36. The method of claim 35, wherein using Kalman filtering comprises avoiding divergence of the Kalman filtering.

37. The method of claim 35, further comprising real-time tuning of the gain of the rotation sensors.

38. A rotatably steerable drilling system comprising:

a drill string configured to drill in a selected direction of a plurality of directions, the drill string comprising a drill bit;

a survey tool in proximity to the drill bit, the survey tool comprising:

a plurality of rotation sensors, each rotation sensor having a sensing axis and a direction of least acceleration sensitivity, each rotation sensor adapted to generate a first signal indicative of a detected angular rotation rate about its sensing axis, the plurality of rotation sensors mounted in a housing with their sensing axes generally parallel to one another and with their directions of least acceleration sensitivity generally non-parallel to one another;

a plurality of acceleration sensors mounted in the housing, each acceleration sensor having a sensing direction, each acceleration sensor adapted to generate a second signal indicative of detected acceleration along its sensing direction; and a controller configured to receive a first signal from each of the plurality of rotation sensors and a second signal from each of the plurality of acceleration sensors, the controller configured to calculate a weighted average of the detected angular rotation rates from the plurality of rotation sensors, the weighted average including the detected angular rotation rate of each rotation sensor about its sensing axis weighted by the detected acceleration along its direction of least acceleration sensitivity, the controller further configured to generate a third signal indicative of the weighted average; and a steering mechanism configured to adjust the selected direction in response to the third signal from the controller.

* * * * *

UNITED STATES PATENT AND TRADEMARK OFFICE
CERTIFICATE OF CORRECTION

PATENT NO. : 7,117,605 B2 Page 1 of 2
APPLICATION NO. : 10/823091
DATED : October 10, 2006
INVENTOR(S) : Ekseth et al.

It is certified that error appears in the above-identified patent and that said Letters Patent is hereby corrected as shown below:

On Page 2, Col. 1 ("U.S. Patent Documents"), Line 12, after 6,347,282, delete "B1" and insert --B2--.

On Page 2, Col. 1 ("U.S. Patent Documents"), Line 16, after 6,484,818, delete "B1" and insert --B2--.

On Page 2, Col. 1 ("U.S. Patent Documents"), Line 17, after 6,655,460, delete "B1" and insert --B2--.

On Page 2, Col. 1 ("U.S. Patent Documents"), Line 18, after 6,659,201, delete "B1" and insert --B2--.

On Page 2, Col. 1 ("U.S. Patent Documents"), Line 19, after 6,845,665, delete "B1" and insert --B2--.

On Page 2, Col. 1 ("U.S. Patent Documents"), Line 20, after 6,848,304, delete "B1" and insert --B2--.

On Page 2, Col. 1 ("U.S. Patent Documents"), Line 21, after 6,859,751, delete "B1" and insert --B2--.

On Page 2, Col. 1 ("U.S. Patent Documents"), Line 22, after 6,895,678, delete "B1" and insert --B2--.

On Page 2, Col. 2 ("Other Publications"), Line 5, delete "Stimulate" and insert --Simulate--.

On Col. 10, Equation 3, after " $SD_p = \sqrt{\dfrac{\sum_i W_i * (R_i - R_p)^2}{(N-1) * \sum_i W_i}}$ " delete ".".

On Col. 11, Line 11, delete "$R_\alpha$" and insert --"$R_a$"--.

On Col. 11, Equation 6, delete " $W_j = \left(\dfrac{SD_{p,j} N_{e,j}}{N}\right)^2$ " and insert -- $W_j = \left(\dfrac{SD_{p,j} * N_{e,j}}{N}\right)^2$ --.

On Col. 12, Equation 8, delete "$\Sigma_{101,k}$ ;" and insert -- $\Sigma_{\Phi,k}$ ;--.

On Col. 14, Lines 62-63, delete "misaliguments," and insert --misalignments,--.

UNITED STATES PATENT AND TRADEMARK OFFICE
CERTIFICATE OF CORRECTION

PATENT NO. : 7,117,605 B2
APPLICATION NO. : 10/823091
DATED : October 10, 2006
INVENTOR(S) : Ekseth et al.

It is certified that error appears in the above-identified patent and that said Letters Patent is hereby corrected as shown below:

On Col. 15, Line 12, delete "$\sigma_{107}$" and insert --$\sigma_\omega$--.

On Col. 15, Equation 20, delete "$dX_1 = [d\omega_{z1} dB_{a1} dB_{b1} dM_1]^T$" and insert -- $dX_1 = [d\omega_{z1} \quad dB_{a1} \quad dB_{b1} \quad dM_1]^T$ --.

On Col. 15, Line 50, delete "$X'_1 = [\omega'_{z1} B'_{a1} B'_{b1} M'_1]^T$" and insert

-- $X'_1 = [\omega'_{z1} \quad B'_{a1} \quad B'_{b1} \quad M'_1]^T$ --.

On Col. 16, Equation 30, delete "$X'_k = [\omega'_{zk} B'_{ak} B'_{bk} M'_k]^T$" and insert -- $X'_k = [\omega'_{zk} \quad B'_{ak} \quad B'_{bk} \quad M'_k]^T$ --.

Signed and Sealed this

Twentieth Day of March, 2007

JON W. DUDAS
*Director of the United States Patent and Trademark Office*